(12) United States Patent
Yamamoto et al.

(10) Patent No.: US 8,923,653 B2
(45) Date of Patent: Dec. 30, 2014

(54) SUPER-RESOLUTION PROCESSING METHOD AND SYSTEM

(75) Inventors: Yutaka Yamamoto, Kyoto (JP); Kengo Zenitani, Kyoto (JP)

(73) Assignee: Yutaka Yamamoto, Kyoto (JP)

( * ) Notice: Subject to any disclaimer, the term of this patent is extended or adjusted under 35 U.S.C. 154(b) by 553 days.

(21) Appl. No.: 13/365,959

(22) Filed: Feb. 3, 2012

(65) Prior Publication Data

US 2012/0328213 A1   Dec. 27, 2012

(30) Foreign Application Priority Data

Jun. 27, 2011   (JP) ................. 2011-141632

(51) Int. Cl.
*G06K 9/00*   (2006.01)
*G06T 3/40*   (2006.01)

(52) U.S. Cl.
CPC ................... *G06T 3/4053* (2013.01)
USPC ................. 382/299; 382/298; 382/300

(58) Field of Classification Search
USPC .................................. 382/298–300
See application file for complete search history.

(56) References Cited

U.S. PATENT DOCUMENTS

| | | | | |
|---|---|---|---|---|
| 7,149,369 B2 * | 12/2006 | Atkins | ............ | 382/299 |
| 7,876,979 B2 * | 1/2011 | Lee et al. | ............ | 382/300 |
| 8,488,823 B2 * | 7/2013 | Yamamoto et al. | ............ | 381/316 |
| 2003/0206663 A1 * | 11/2003 | Daly | ............ | 382/260 |

FOREIGN PATENT DOCUMENTS

| | | |
|---|---|---|
| JP | A-2001-127637 | 5/2001 |
| JP | A-2001-358561 | 12/2001 |
| JP | B2-3820331 | 9/2006 |
| JP | B2-3851757 | 11/2006 |
| WO | WO 2009/069292 A1 | 6/2009 |

OTHER PUBLICATIONS

Saito, "Breaking the Limit of the Sampling Theorem: Super-resolution Oversampling from a Single Image," *The ITE Journal*, 2008, pp. 181-189, vol. 62, No. 2.
Kakemizu et al., "Noise Reduction of JPEG Images by Sampled-Data $H^\infty$ Optimal ε Filters," SICE Annual Conference 2005 in Okayama, Aug. 8-10, 2005 Okayama University, Japan, 2005, pp. 1080-1085.
Kakemizu, "Sanpuru-chi $H^\infty$Seigyo Riron Ni Yoru Dijitaru Gazou Fukugen (Digital Image Restoration by Sampled-Data $H^\infty$ Control Theory)," Master's Thesis at Kyoto University, 2005.
Yamamoto, "Computation and Convergence of Frequency Response via Fast Sampling for Sampled-Data Control Systems," Proceedings of the $36^{th}$ Conference on Decision and Control, Dec. 1997, pp. 2157-2162, IEEE, California, USA.
Khargonekar, "Delayed Signal Reconstruction Using Sampled-Data Control," Proceedings of the $35^{th}$ Conference on Decision and Control, Dec. 1996, pp. 1259-1263, IEEE, Kobe, Japan.

* cited by examiner

*Primary Examiner* — Wesley Tucker
(74) *Attorney, Agent, or Firm* — Oliff PLC

(57) ABSTRACT

Super-resolution processing is regarded as a kind of inter-sample interpolation process and performed by using a linear interpolation filter designed according to sampled-data control theory. In an error-system model used in the process of designing the filter, a pre-filter is disposed before a sampler and a post-filter is disposed after the zero-order hold in a signal restoration system. At least either one of the characteristic Q(s) of the pre-filter or the characteristic P(s) of the post-filter is designed to be a low-pass characteristic, whereby the gain of the characteristic K(z) of a digital filter within a middle-to-high frequency range is raised. Raising the gain makes jaggies more prominent. To reduce this effect, in an actual processing system, the image to be processed is passed through a low-pass filter to reduce high-frequency components before the linear interpolation is performed.

4 Claims, 11 Drawing Sheets

IMAGE RESTORED BY GAIN COMPENSATION ONLY

JAGGY REDUCTION:
IMAGE RESTORED BY [METHOD 1]

JAGGY REDUCTION:
IMAGE RESTORED BY [METHOD 2]

Fig. 13A LANCZOS METHOD (TWICE ENLARGED)
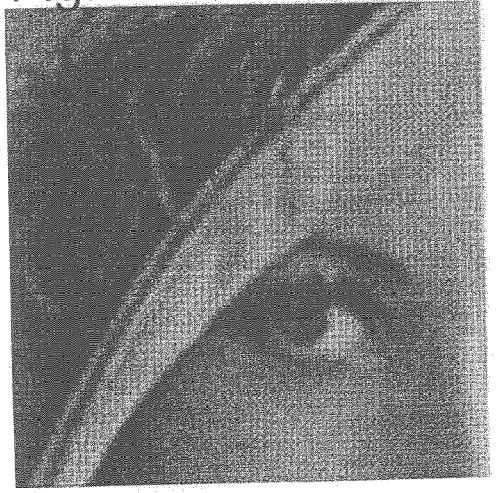 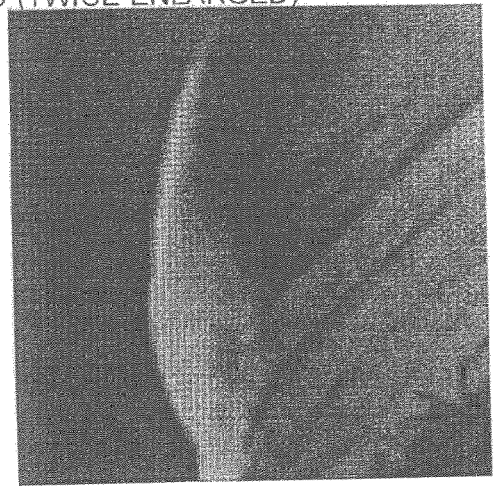
Fig. 13B TV REGULARIZATION (TWICE ENLARGED)
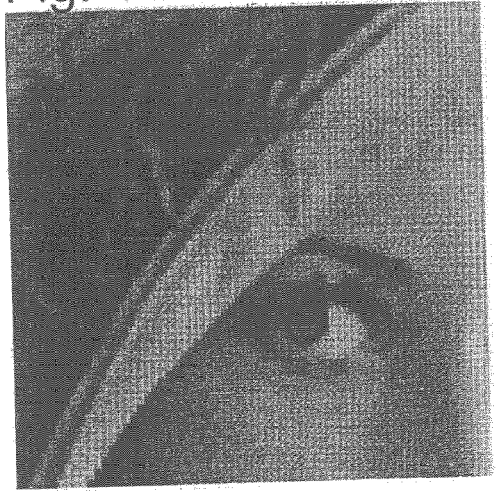 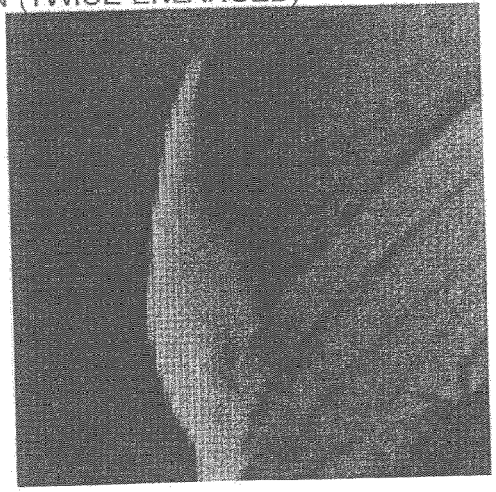
Fig. 13C PRESENT INVENTION (TWICE ENLARGED)
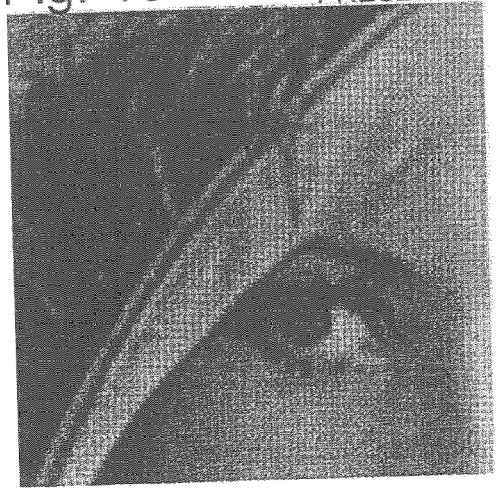 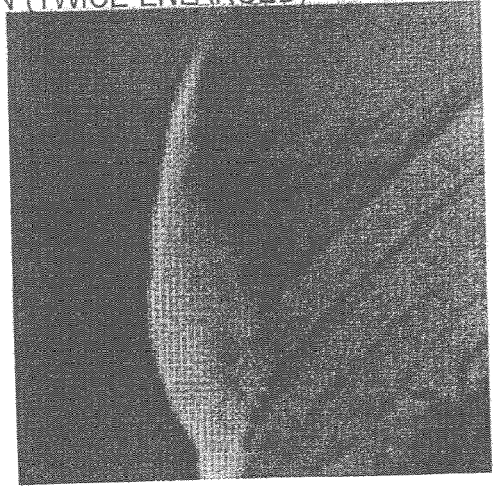

Fig. 14A  LANCZOS METHOD (TWICE ENLARGED)
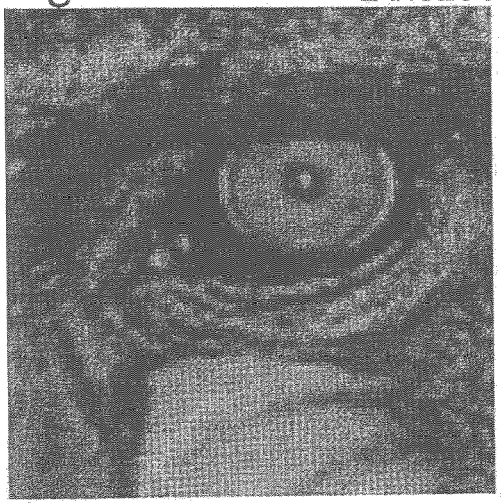
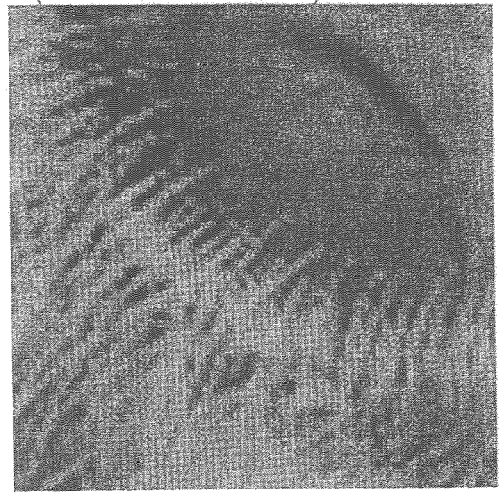
Fig. 14B  TV REGULARIZATION (TWICE ENLARGED)
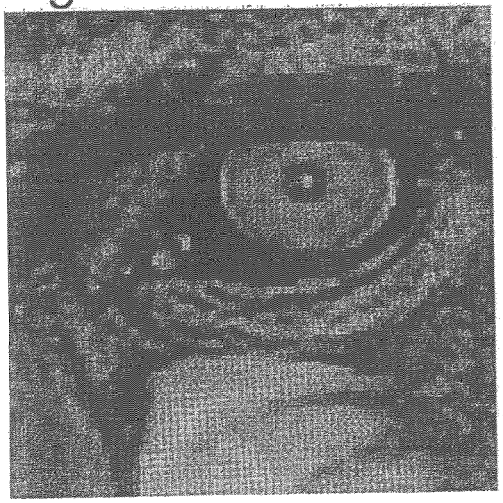
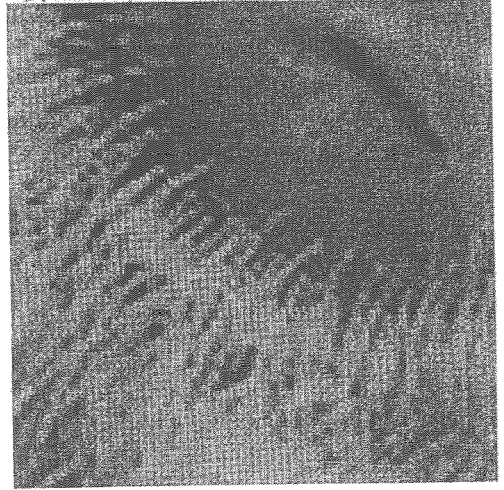
Fig. 14C  PRESENT INVENTION (TWICE ENLARGED)
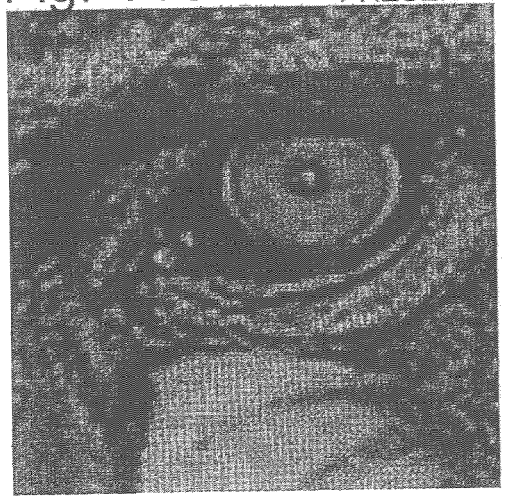
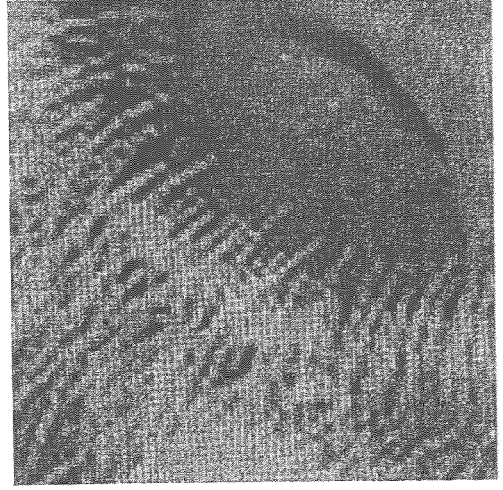

Fig. 15A  LANCZOS METHOD (4-TIMES ENLARGED)
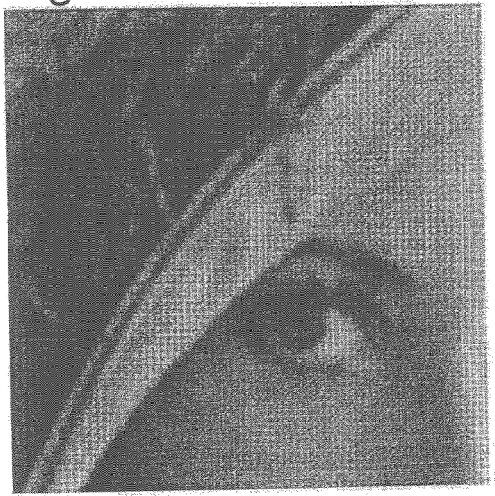 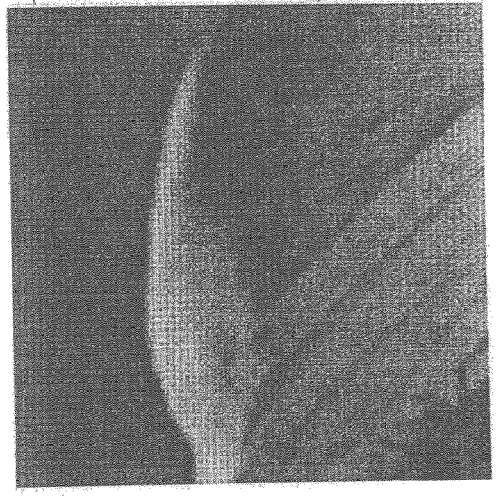
Fig. 15B  TV REGULARIZATION (4-TIMES ENLARGED)
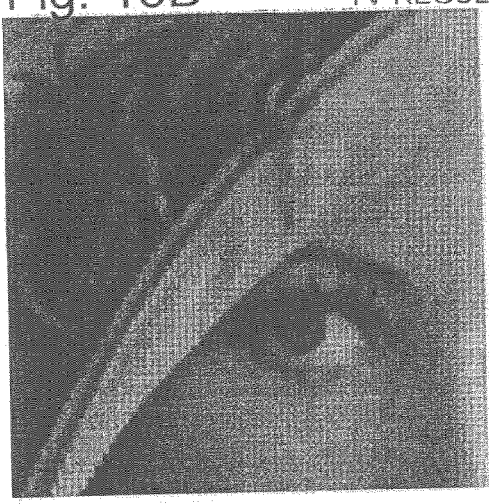 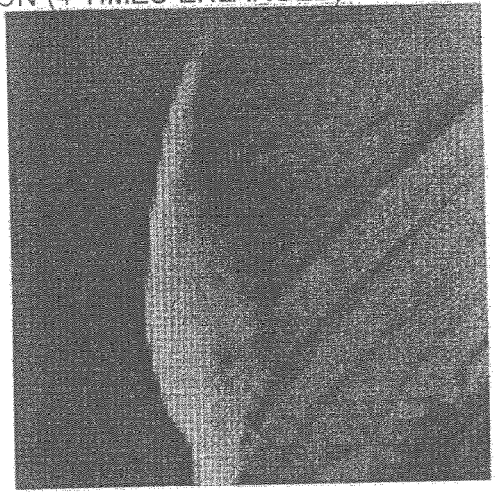
Fig. 15C  PRESENT INVENTION (4-TIMES ENLARGED)
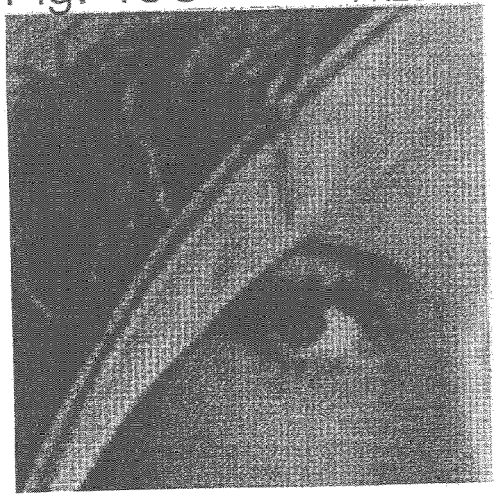 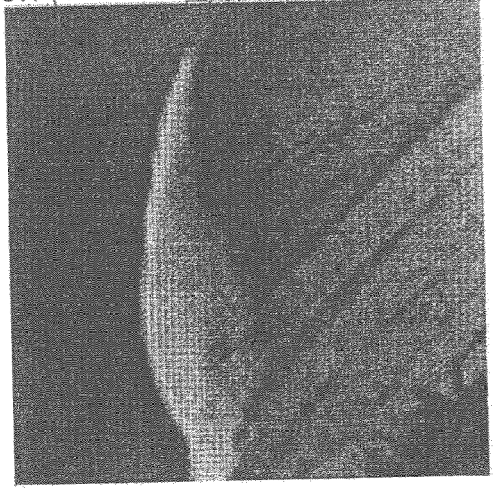

Fig. 16A  LANCZOS METHOD (4-TIMES ENLARGED)
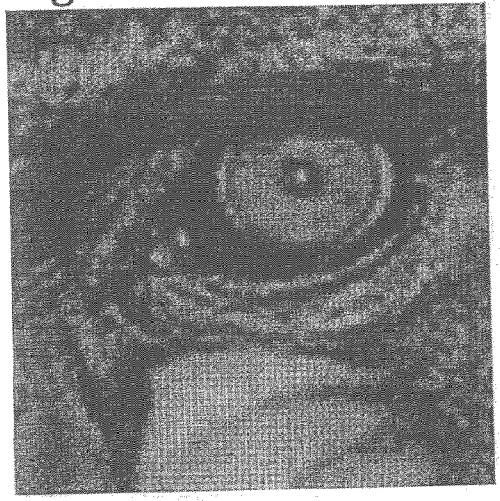 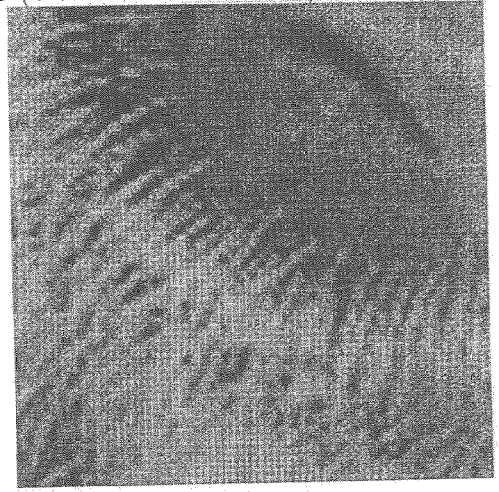
Fig. 16B  TV REGULARIZATION (4-TIMES ENLARGED)
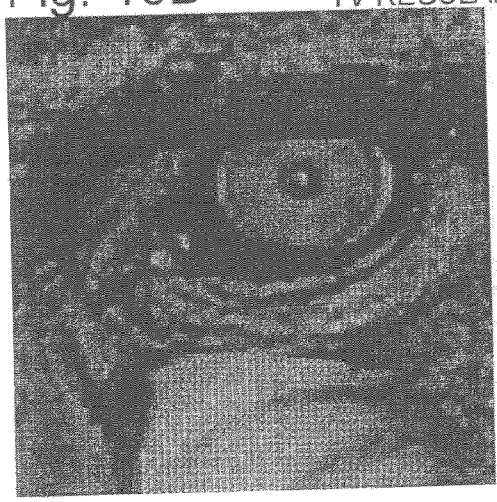 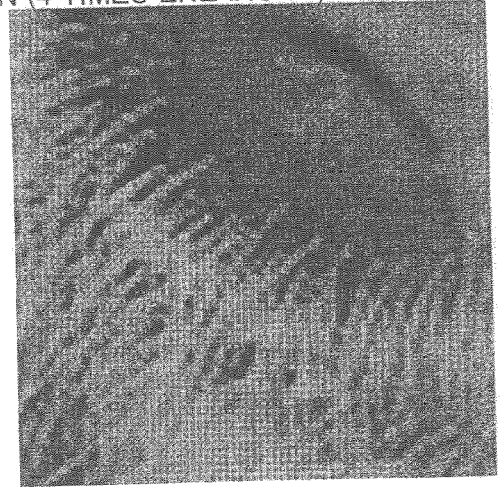
Fig. 16C  PRESENT INVENTION (4-TIMES ENLARGED)
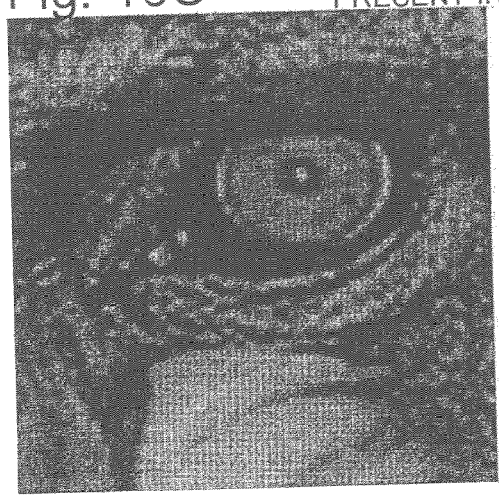 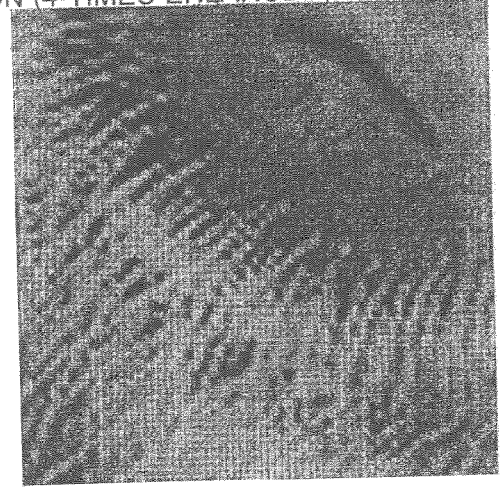

Fig. 17A  LANCZOS METHOD (8-TIMES ENLARGED)
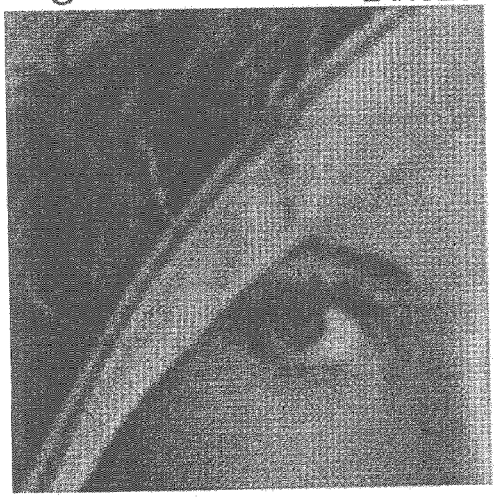
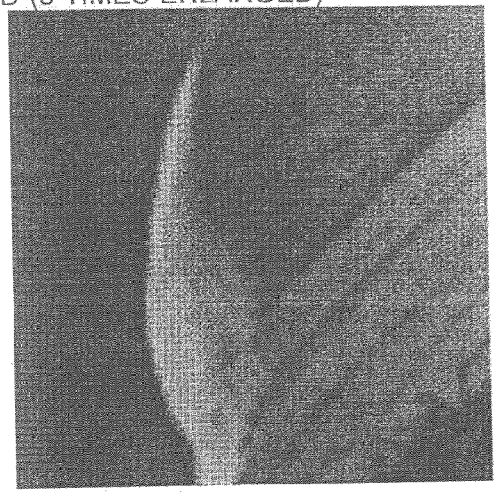
Fig. 17B  TV REGULARIZATION (8-TIMES ENLARGED)
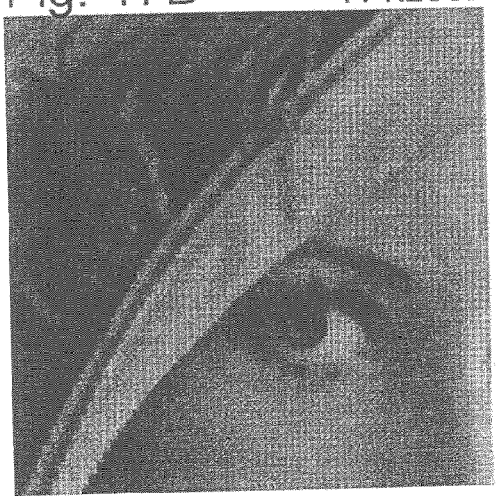
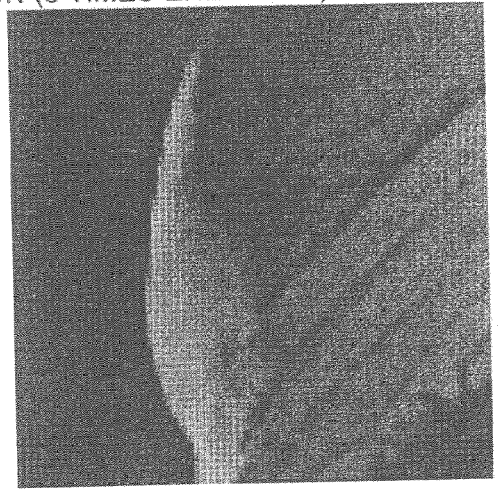
Fig. 17C  PRESENT INVENTION (8-TIMES ENLARGED)
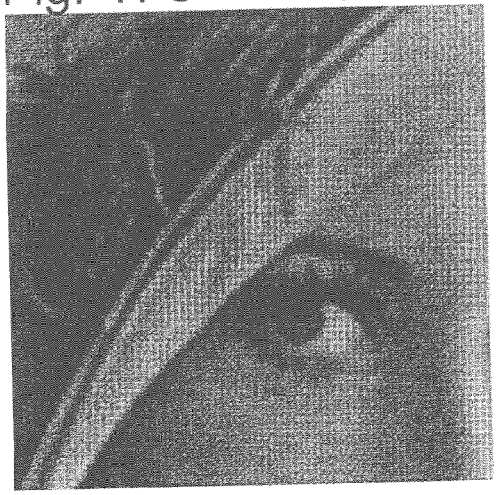
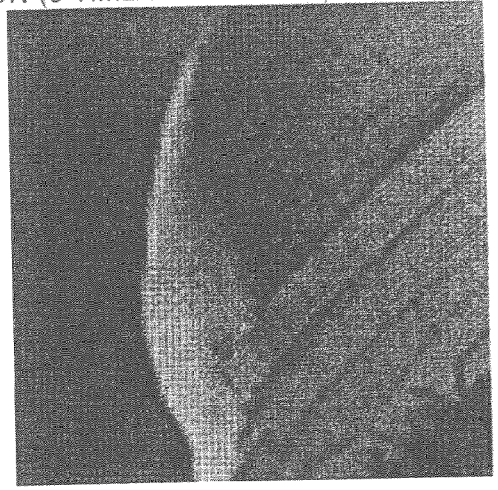

Fig. 18A  LANCZOS METHOD (8-TIMES ENLARGED)
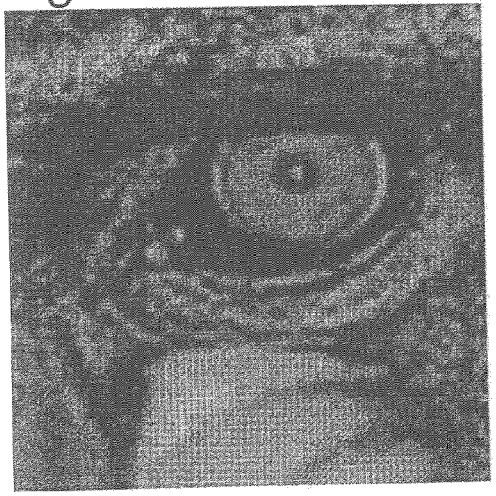
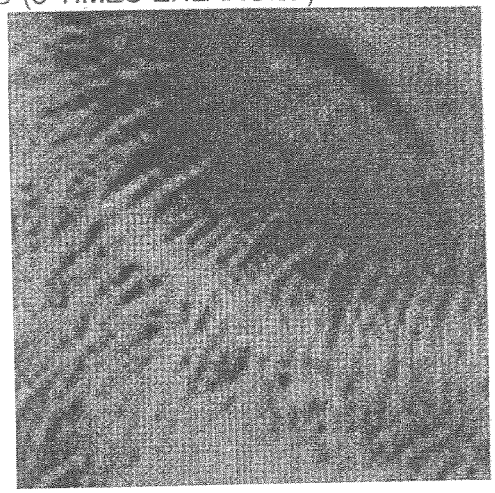
Fig. 18B  TV REGULARIZATION (8-TIMES ENLARGED)
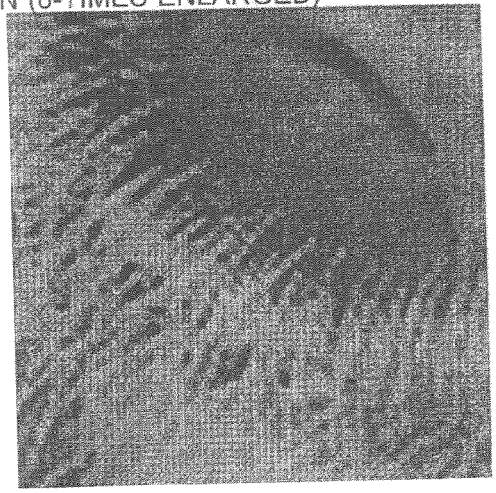
Fig. 18C  PRESENT INVENTION (8-TIMES ENLARGED)
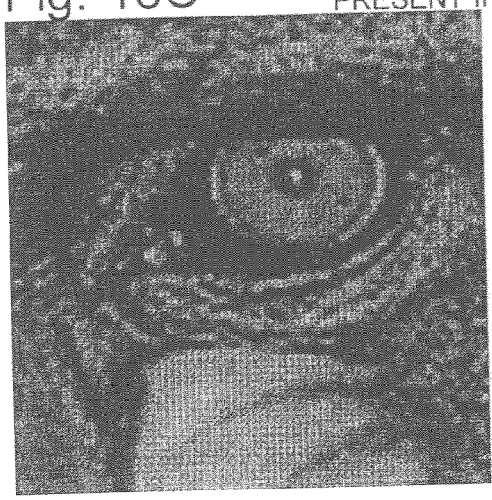
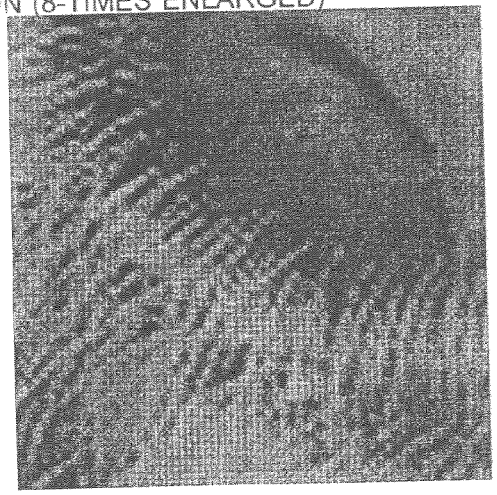

SUPER-RESOLUTION PROCESSING METHOD AND SYSTEM

TECHNICAL FIELD

The present invention relates to a super-resolution processing method for producing a high-resolution image from a low-resolution image by super-resolution processing, and also to a super-resolution processing system using this method.

BACKGROUND ART

Super-resolution processing is an image-processing technique for restoring or creating a high-resolution, high-quality image from a low-resolution, low-quality image that has been degraded due to observation or other reasons or taken with a low-resolution imaging device. With the development of high-definition television sets (and similar receivers) and various types of high-definition display devices in recent years, the super-resolution processing has been one of the most important techniques in the field of image processing.

Examples of commonly known super-resolution processing methods include the bilinear method, bicubic method and Lanczos method. Any of these methods is a type of data interpolation method using a linear filter having a low-pass characteristic. Such a method has the advantage that it can be easily implemented in practical systems since the processing can be performed with a relatively small amount of computation and a small amount of processing load on hardware components. However, this method is unsuitable for the reproduction of high-frequency components and therefore hardly applicable to the restoration or creation of an image without losing the sharpness on the edges of the image.

In recent years, a super-resolution processing method using total variation (TV) regularization has been proposed (for example, refer to Non-Patent Document 1). In this technique, the total fluctuation of a restored image is minimized by using statistical information of the noise. An advantage of this technique exists in that image degradation due to ringing or overshooting can be prevented while maintaining the sharpness on the edges of the image. However, this technique is unsuitable for real-time processing, because, in principle, it requires iterative computation to solve an optimization problem, which inevitably involves an enormous amount of computation. Furthermore, due to the high processing load on the hardware components, this technique is difficult to be implemented in a low-cost system.

Over the years, and particularly in the field of digital audio technology, the present inventors have continued research in the attempt of introducing sampled-data control theory (more specifically, sampled-data $H^\infty$ (H-infinity) control), which enables the handling of continuous-time characteristics, into digital-to-analogue conversion, sampling-rate conversion and similar techniques for handling digital audio signals (refer to Patent Documents 1 and 2). The technique was aimed at enhancing sound quality to the highest or nearly highest level in terms of audibility as analogue audio by designing a digital filter for digital-to-analogue conversion or sampling-rate conversion which not merely handled the sampled original digital signals as discrete-time signals but also took into account the analogue characteristics contained in the intersample behavior.

Furthermore, in view of the recent development in image compression techniques and the necessity for a corresponding improvement of image quality, the present inventors have been conducting intensive research in the attempt of applying the basic idea of the aforementioned audio signal processing, i.e. sampled-data $H^\infty$ optimization, to image processing techniques, such as noise removal or resolution conversion. One example is the image noise removal method proposed in Patent Document 3, by which a high level of image quality, which maintains good properties of the original image, can be achieved while suppressing the block noise or mosquito noise, which are likely to appear in MPEG videos or other compressed images when the compression ratio is high. Non-Patent Documents 2 and 3 disclose a resolution convertor capable of converting the resolution of an image by a desired factor by performing intersample interpolation using a digital filter designed on the basis of sampled-data $H^\infty$ optimization.

BACKGROUND ART DOCUMENT

Patent Document

Patent Document 1: JP-B 3820331
Patent Document 2: JP-B 3851757
Patent Document 3: WO-A1 2009/069292

Non-Patent Document

Non-Patent Document 1: T. Saito, "Breaking the Limit of the Sampling Theorem: Super-resolution Oversampling from a Single Image", *The ITE Journal*, vol. 62, no. 2 (2008), pp. 181-189

Non-Patent Document 2: H. Kakemizu et al., "Noise Reduction of JPEG Images by Sampled-data H-infinity Optimal Epsilon Filters", *Proc. SICE Annual Conference*, 2005, pp. 1080-1085

Non-Patent Document 3: H. Kakemizu, "Sanpuru-chi $H^\infty$ Seigyo Riron Ni Yoru Dijitaru Gazou Fukugen (Digital Image Restoration by Sampled-Data $H^\infty$ Control Theory)", Master's Thesis at Kyoto University, 2005

SUMMARY OF THE INVENTION

Problem to be Solved by the Invention

Details of the resolution conversion technique disclosed in Non-Patent Documents 2 and 3 will be described later. Simply put, this is a technique in which the super-resolution processing is regarded as a kind of intersample interpolation and sampled-data control theory is applied to the design of the digital filter for the intersample interpolation. This method is naturally applicable to super-resolution processing. However, studies by the present inventors have revealed that simply applying this conventional method to super-resolution processing is inferior to the Lanczos method in terms of the degree of similarity between the original and restored images. In particular, jaggies were prominent on the edges of the restored image.

The present invention has been developed in view of the aforementioned problem, and its objective is to provide a super-resolution processing method and system capable of restoring or creating a high-resolution image without losing the sharpness on the edges of the image, while dramatically reducing the amount of computation as compared to the total variation regularization or other conventional techniques.

Means for Solving the Problems

A first aspect of the present invention aimed at solving the aforementioned problem is a super-resolution processing method for creating a high-resolution image from a low-resolution image, in which super-resolution processing is carried out by performing an interpolation between picture elements by using a linear digital filter in each of the horizontal and vertical directions of an image to be processed, wherein:

the linear digital filter is an IIR filter using, as coefficients thereof, parameters calculated by solving the following equation formulated so as to design an IIR filter with no limitation on the order:

$$\| T_{ew} \| := \sup_{w \in L^2[0,\infty), w \neq 0} \frac{\| T_{ew} w \| L^2[0, \infty)}{\| w \| L^2[0, \infty)} < \gamma$$

by sampled-data $H^\infty$ control so that the error signal e will be smaller than the prespecified performance level $\gamma$ in terms of the $H^\infty$ norm, where the error signal e corresponds to the error between the band-limited signal obtained by passing an analogue signal w of an original image through a band-limiting filter and the original analogue signal obtained by passing the band-limited signal through an analogue-digital-analogue conversion system including a sampler for discretizing the analogue signal, an upsampler for inserting a predetermined number of zeros between sampling points, a digital filter a hold element for restoring a discrete signal to a continuous signal, and at least either one of a pre-filter and a post-filter for weighting the continuous signal in the frequency domain, the frequency characteristic of the pre-filter or the post-filter being determined so as to compensate for a decrease in the gain within a middle-to-high frequency range in the low-resolution image to be processed, and $T_{ew}$ is the transfer function of the system that transforms the analogue signal w into the error signal e; and a low-pass filter is provided before the linear digital filter for smoothing the signal of the low-resolution image to be processed.

To carry out the super-resolution processing method according to the first aspect of the present invention, the second aspect of the present invention aimed at solving the aforementioned problem provides a super-resolution processing system including the aforementioned linear digital filter and a low-pass filter provided before the linear digital filter, the low-pass filter being used for smoothing the signal of the low-resolution image to be processed.

A third aspect of the present invention aimed at solving the aforementioned problem is a super-resolution processing method for creating a high-resolution image from a low-resolution image, in which super-resolution processing is carried out by performing an interpolation between picture elements by using a linear digital filter in each of the horizontal and vertical directions of an image to be processed, wherein:

the linear digital filter is an IIR filter using, as coefficients thereof, parameters calculated by solving the following equation formulated so as to design an IIR filter with no limitation on the order:

$$\| T_{ew} \| := \sup_{w \in L^2[0,\infty), w \neq 0} \frac{\| T_{ew} w \| L^2[0, \infty)}{\| w \| L^2[0, \infty)} < \gamma$$

by sampled-data $H^\infty$ control so that the error signal e will be smaller than the prespecified performance level $\gamma$ in terms of the $H^\infty$ norm, where the error signal e corresponds to error between the band-limited signal obtained by passing an analogue signal w of an original image through a band-limiting filter and the analogue signal obtained by passing the band-limited signal through an analogue-digital-analogue conversion system including a sampler for discretizing the analogue signal, an upsampler for inserting a predetermined number of zeros between sampling points, a digital filter, a hold element for restoring a discrete signal to a continuous signal, and at least either one of a pre-filter and a post-filter for weighting the continuous signal in the frequency domain, the frequency characteristic of the pre-filter or the post-filter being determined so as to compensate for a decrease in the gain within a middle-to-high frequency range in the low-resolution image to be processed, and $T_{ew}$ is the transfer function of the system that transforms the analogue signal w into the error signal e; and when the parameters used as the coefficients of the IIR filter are calculated, the gain within a middle-to-high frequency range and high frequency range of the analogue frequency characteristic of the band-limiting filter is set to be lower than the level corresponding to the frequency characteristic of the low-resolution image to be processed.

To carry out the super-resolution processing method according to the third aspect of the present invention, the fourth aspect of the present invention aimed at solving the aforementioned problem provides a super-resolution processing system including the aforementioned linear digital filter designed as an IIR filter, wherein the parameters used as the coefficients of the IIR filter are calculated under the condition that the gain of the analogue frequency characteristic of the band-limiting filter within a middle-to-high frequency range and high frequency range is set to be lower than the level corresponding to the frequency characteristic of the low-resolution image to be processed.

In any of the first through fourth aspects of the present invention, the process of solving the conditional equation by sampled-data $H^\infty$ control may include, for example, the step of deriving an approximate calculation formula by converting the entire error system into a finite-dimensional discrete-time system by applying the first-sample first-hold approximation, and the step of solving the approximate calculation formula by $H^\infty$ control under the condition that the prespecified performance level $\gamma$ in the conditional equation is set at the minimal value or almost minimal value.

In the conventional resolution conversion method based on Non-Patent Document 2 or 3, it is assumed that the sampler in the analogue-digital-analogue conversion system functions as an observation function (a function that describes the state of image-quality deterioration from the original image due to observation). A study by the present inventors has revealed that, in most of the practical cases, the gain of the signal within the middle-to-high frequency range of the low-resolution image to be processed is lower than expected. This is considered to be due to the effect of additional factors, such as the optical blurring of an image or the averaging of the signal due to the digital signal processing.

By contrast, in any of the super-resolution processing methods and systems according to the first through fourth aspects of the present invention, when the coefficients of the linear digital filter are calculated by using sampled-data $H^\infty$ control theory, an analogue-digital-analogue conversion system including one or both of a pre-filter and a post-filter is used in the error model. Assuming that one or both of the pre-filter and post-filter are a low-pass filter, the coefficients of the linear digital filter are calculated so as to compensate for the decrease in the gain within a middle-to-high frequency range so that the entire analogue-digital-analogue conversion system will maintain the gain within the middle-to-high frequency range. As compared to a linear digital filter designed in a system with neither the pre-filter nor the post-filter, the linear digital filter designed in the first through fourth aspects of the present invention has higher levels of gain within the middle-to-high frequency range. As a result of this gain compensation, the spectrum of the restored image created by the super-resolution processing through the present linear digital filter becomes closer to that of the original image. Thus, the restoring performance of the super-resolution processing is improved.

The previously described gain compensation within the middle-to-high frequency range may possibly cause jaggies to more prominently appear on contours or the like in the image, since jaggies originate from high-frequency components. To address this problem, in the super-resolution processing method and system according to the first and second aspects of the present invention, the low-resolution image to be processed is pre-processed by a low-pass filter so as to weaken the high-frequency components of the image signal, which are the possible cause of jaggies, at the input stage. This means that any sharp change in the low-resolution image to be processed is alleviated on a hardware basis. On the other hand, in the super-resolution processing method and system according to the third and fourth aspects of the present invention, the analogue frequency characteristic of the band-limiting filter is replaced with a stronger low-pass characteristic at the stage of designing the linear digital filter. As a result, the tendency of restoration of the high-frequency components by the linear digital filter is alleviated. This means that the target level for the signal restoration is changed. Any of the two methods effectively attenuates high-frequency components in the restored image, making jaggies less prominent.

Effect of the Invention

The super-resolution processing methods according to the first and third aspects of the present invention and the super-resolution processing systems according to the second and fourth aspects of the present invention significantly improve the restoring performance of the super-resolution processing. The restored image will be very close to the original image, with jaggies less prominent. The super-resolution processing used in the first through fourth aspects of the present invention is a linear processing, which dramatically reduces the amount of computation as compared to the conventional TV regularization or similar techniques. Accordingly, the super-resolution processing method and system according to the present invention are suitable for real-time processing. Furthermore, the reduced processing load relaxes constraints on the hardware configuration of the system.

BRIEF DESCRIPTION OF THE DRAWINGS

FIGS. 13A-13C are restored images (partially enlarged views of "Lena") respectively obtained by twice enlarged super-resolution processing.

FIGS. 14A-14C are restored images (partially enlarged views of "Baboon") respectively obtained by twice enlarged super-resolution processing.

FIGS. 15A-15C are restored images (partially enlarged views of "Lena") respectively obtained by four-times enlarged super-resolution processing.

FIGS. 16A-16C are restored images (partially enlarged views of "Baboon") respectively obtained by four-times enlarged super-resolution processing.

FIGS. 17A-17C are restored images (partially enlarged views of "Lena") respectively obtained by eight-times enlarged super-resolution processing.

FIGS. 18A-18C are restored images (partially enlarged views of "Baboon") respectively obtained by eight-times enlarged super-resolution processing.

BEST MODE FOR CARRYING OUT THE INVENTION

One embodiment of the super-resolution processing method and system according to the present invention is hereinafter described with reference to the attached figures.

In the method and system according to the present invention, the super-resolution processing is regarded as an inter-sample interpolation process. The super-resolution processing is performed by means of a linear interpolation filter using sampled-data control theory. Basically, similar to the bicubic method or other conventional techniques, the super-resolution processing is carried out by a two-dimensional linear convolution operation on Z-times upsampled data of an observed image. Sampled-data control theory is used in designing the convolution kernel.

Figure 1:
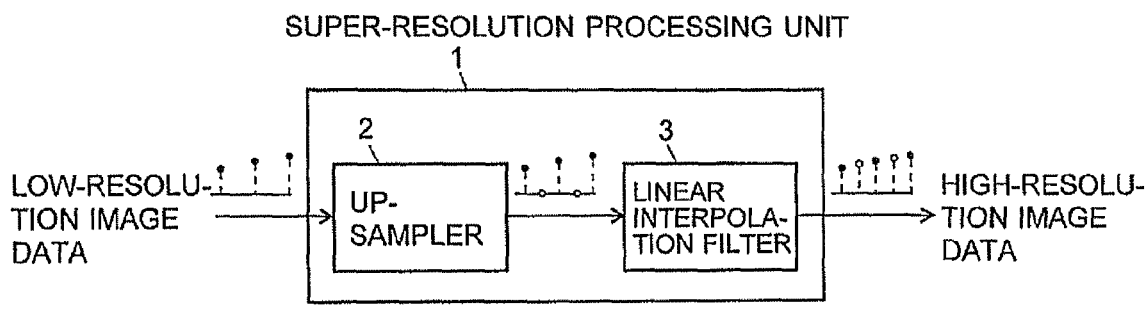
FIG. 1 is a schematic block diagram of one mode of the super-resolution processing system according to the present invention.

FIG. 1 is a schematic block diagram of one mode of the super-resolution processing system according to the present invention.

As shown in FIG. 1, the super-resolution processing unit 1 includes an upsampler 2 which performs upsampling of an input of low-resolution image data to insert zero data between sampling points, and a linear interpolation filter 3 which calculates, for each of the inserted zero data, an interpolated value that should replace the zero data, using the data values of the samples in the vicinity of the zero data. The linear interpolation filter 3 is an $H^\infty$-optimal linear filter, which is an important element that performs a two-dimensional convolution operation.

In advance of the description of a method for designing the $H^\infty$-optimal linear filter used in the present invention, a method for designing a conventional $H^\infty$-optimal linear filter for resolution conversion, which is disclosed in Non-Patent Document 2, is hereinafter described. The basics of the herein used filter-designing method using sampled-data control theory are described in papers written by the present inventors and published in various academic journals as well as in Patent Documents 1 and 2.

Figure 2:
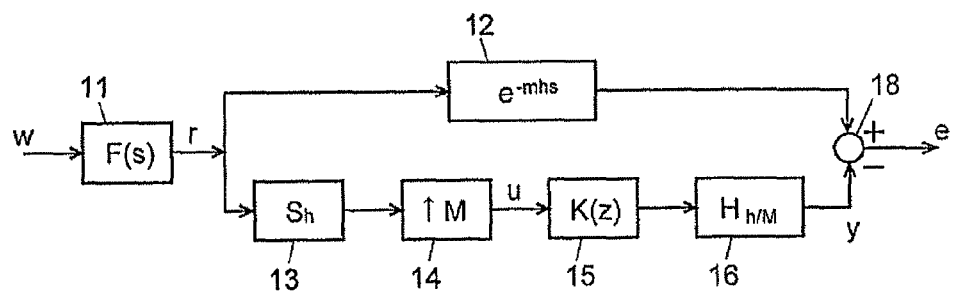
FIG. 2 is an error-system model for designing a digital filter used in a super-resolution processing according to the conventional method.

An error-system model for designing an $H^\infty$-optimal linear filter with transfer function K(z) is shown in FIG. 2. In this figure, the lower signal path is a signal-processing system for rate conversion by a resolution converter, and the upper signal path is a delay system in which the time delay due to the aforementioned signal-processing system is taken into account. The input w is a continuous-time signal. F(s) is an anti-aliasing filter 11 for limiting the bandwidth of the continuous-time signal. $S_h$ is a sampler 13 for sampling the continuous-time signal with sampling period h (>0) to produce a discrete-time signal. ↑ M is an upsampler 14 for converting this discrete-time signal into a discrete-time signal of sampling period h/M by inserting zero signals between the sampling points of the original discrete-time signal. K(z) is a digital filter 15 for correcting the inserted zero signals to appropriate values. $H_{h/M}$ is the zero-order hold 16 which operates at period h/M to convert the discrete-time signal into a continuous-time signal. The block $e^{-mhs}$ is a delay element 12, which delays the band-limited signal r by delay mh. The subtractor 18 extracts the error signal e between the restored signal y produced by the zero-order hold 16 and the delayed band-limited signal. The error signal e is also a continuous-time signal.

For this system, an IIR digital filter 15 that minimizes the error signal e must be constructed. That is to say, an IIR digital filter 15 should be designed under the conditions that the continuous-time filter (anti-aliasing filter 11) is stable and the values of m and M are positive number. For this purpose, a transfer characteristic K(z) that satisfies the following equation for a given value of γ is determined:

$$\| Tew \| := \sup_{w \in L^2[0,\infty), w \neq 0} \frac{\| Teww \| L^2[0,\infty)}{\| w \| L^2[0,\infty)} < \gamma \quad (1)$$

where $T_{ew}$ is a system for converting a continuous-time signal w into an error signal e.

Equation (1) is the conditional equation formulated so as to design the IIR digital filter. The parameter γ is a performance level that governs the magnitude of the error and should be as small as possible. In $H^\infty$ control, this value is minimized by repetitive computation.

Due to the inclusion of the upsampler, the error system of FIG. 2 has become a time-varying system and in this form is difficult to handle. To address this problem, a discrete-time lifting and inverse lifting are introduced so as to convert this system including the upsampler and delay (multi-rate system) into a finite-dimensional system having a single sampling period. As is commonly known from the aforementioned documents, when liftings is introduced, the multi-rate system model shown in FIG. 2 becomes equivalent to a single-rate system model shown in FIG. 3. Subsequently, a conversion for delaying the input to the system by m steps is performed to change the continuous-time delay $e^{-mhs}$ in FIG. 3 into a finite-dimensional element. As a result, the problem of designing a desired system is converted to the problem of designing an non-causal filter $z^m K'(z)$ in place of the transfer characteristic K(z).

This problem is further reduced to the problem of designing a finite-dimensional discrete-time system. Details of this technique are described in Khargonekar and Yamamoto, "Delayed signal reconstruction using sampled-data control", *Proc. of 35th Conf. on Decision and Control*, pp. 1259-1263, 1996. In the present case, the first-sample first-hold (FSFH) method is used to reduce the aforementioned problem to the problem of designing an approximate finite-dimensional discrete-time system free from constraints.

The FSFH method is a technique for evaluating the performance of a sampled-data control system. Continuous-time input and output of a sampled-data system with period h are discretized by a sampler and hold operating at period h/N (where N is a natural number), with the value of N set to be sufficiently large so that the resultant discrete-time signal will be approximate to a continuous-time signal. Details of the FSFH method are described in Yamamoto, Madievski and Anderson, "Computation and convergence of frequency response via fast sampling for sampled-data control systems", *Proc. of 36th Conf. on Decision and Control*, pp. 2157-2161, 1997. Accordingly, no explanation will be given this description.

Figure 3:
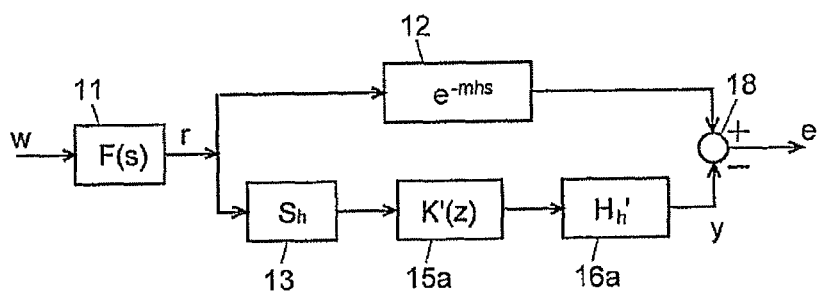
FIG. 3 is a block diagram of the error-system model obtained by converting the model shown in FIG. 2 into a single-rate system model.
Figure 4:
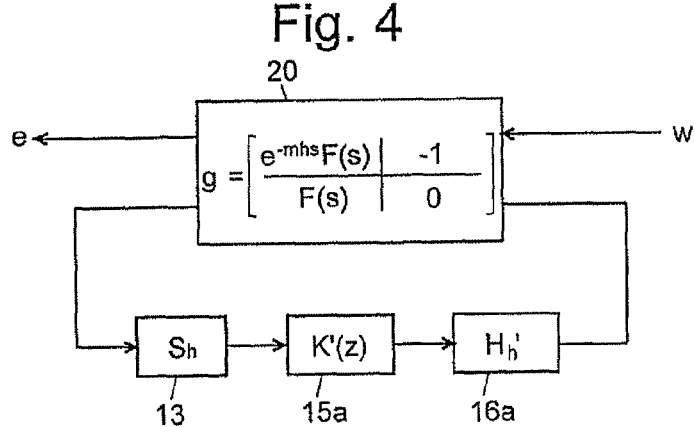
FIG. 4 is a block diagram of the error-system model obtained by rewriting the model shown in FIG. 3 into the form of a generalized plant.
Figure 5:
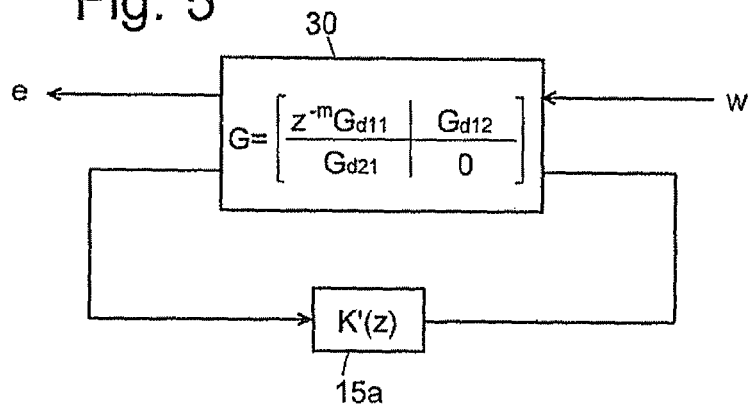
FIG. 5 is a block diagram of the error-system model obtained by converting the model shown in FIG. 4 into a finite-dimensional discrete-time system.

For design purposes, the system shown in FIG. 3 has been changed into a generalized plant form as shown in FIG. 4. Lifting the system matrix g of the continuous-time system 20 shown in FIG. 4 and approximately discretizing it by the FSFH method results in a discrete-time system as shown in FIG. 5. The approximate discrete-time system G in the sampled-data system 30 is expressed as follows:

$$G := \begin{bmatrix} A_d & B_{d1} & B_{d2} \\ \hline C_{d1} & D_{d11} & D_{d12} \\ C_{d2} & 0 & 0 \end{bmatrix}$$

$$\begin{bmatrix} F(s) & -P(s) \\ F(s) & 0 \end{bmatrix} =: \begin{bmatrix} A_c & B_{c1} & B_{c2} \\ \hline C_{c1} & 0 & D_{c12} \\ C_{c2} & 0 & 0 \end{bmatrix},$$

where the matrices and operators are defined as follows:

$$A_d := e^{A_c h} = A^M$$

$$B_{d1} := [A^{M-1} B_1 \ \ldots \ B_1], \ B_1 = \int_0^{\frac{h}{M}} e^{A_c \tau} B_{c1} \, d\tau$$

$$B_{d2} := [A^{M-1} B_2 \ \ldots \ B_2], \ B_2 = \int_0^{\frac{h}{M}} e^{A_c \tau} B_{c2} \, d\tau$$

$$C_{d1} := \begin{bmatrix} C_{c1} \\ \vdots \\ \vdots \\ C_{c1} A^{M-1} \end{bmatrix}, \ C_{d2} := \begin{bmatrix} C_{c2} \\ \vdots \\ \vdots \\ C_{c2} A^{M-1} \end{bmatrix}$$

$$D_{d11} := \begin{bmatrix} 0 & \ldots & \ldots & \ldots & 0 \\ C_{c1} B_1 & \ddots & \ddots & \ddots & \vdots \\ C_{c1} A B_1 & C_{c1} B_1 & \ddots & \ddots & \vdots \\ \vdots & \ddots & \ddots & \ddots & 0 \\ C_{c1} A^{M-2} B_1 & \ldots & \ldots & C_{c1} B_1 & 0 \end{bmatrix}$$

$$D_{d12} := \begin{bmatrix} D_{c12} & 0 & \ldots & \ldots & 0 \\ C_{c2} B_2 & D_{c12} & \ddots & \ddots & \vdots \\ C_{c2} A B_2 & C_{c2} B_2 & \ddots & \ddots & \vdots \\ \vdots & \ddots & \ddots & \ddots & 0 \\ C_{c2} A^{M-2} B_2 & \ldots & \ldots & C_{c2} B_2 & D_{c12} \end{bmatrix}$$

Using the approximate discrete-time system G, the aforementioned equation (1) can be approximated by the following equation (2):

$$\|z^{-m}G_{d11}(z)+G_{d12}(z)K'(z)Gd_{21}(z)\|_\infty > \gamma \quad (2)$$

where $$\begin{bmatrix} G_{d11}(z) & G_{d12}(z) \\ G_{d21}(z) & 0 \end{bmatrix} := G(z).$$

Thus, the problem of determining a transfer function K(z) that satisfies the conditional equation (1) can be approximately reduced to a finite-dimensional discrete-time problem. That is to say, the system shown in FIG. 4 can be converted to a finite-dimensional discrete-time system shown in FIG. 5.

Given this equation (2), the transfer function K(z) of the desired IIR digital filter can be determined by solving the discrete-time $H^\infty$ control problem by a generally known method.

Back to FIG. 2, when the characteristic of an analogue signal to be restored is given in the form of a continuous-time transfer function F(s), the filter interpolates the intersample data of the discrete signal so that the error e between the signal r given by the characteristic of the analogue signal and the restored signal y produced by the signal restoration system will be minimized in terms of the $H^\infty$ norm of the system from w to e. When this system is applied to super-resolution processing, a continuous-time signal which gives the original image showing a continuous scene or the like that has been sampled is the analogue signal to be restored. That is to say, when the input to the upsampler 14 is a signal corresponding to an observed image, the filtering process by K(z) (↑ M) corresponds to a super-resolution processing by the factor of Z=M. It should be noted that this is a one-dimensional process. For two-dimensional applications, the intersample interpolation should be performed in each of the horizontal and vertical directions of the image. This can be expressed as a two-dimensional convolution processing of upsampled data by defining the convolution kernel by an impulse response of K(z).

However, a test of super-resolution processing, in which the analogue characteristic F(s) and observation function were appropriately prepared and a testing low-resolution image was created from an original image, has revealed that the super-resolution processing using the digital filter 15 having the transfer characteristic of K(z) designed on the basis of the error-system model shown in FIG. 2 is inferior to the conventional Lanczos method in terms of the degree of similarity between the original and restored images, and that the restored image becomes more jagged than in the case of the Lanczos method. To investigate the reason, a spectrum of the input signal u to the digital filter 15 (actually, to the linear interpolation filter 3) was measured, using the standard test image "Lena" shown in FIG. 8 as the original image. The measured result was as shown by the magnitude plot in FIG. 7.

Figure 7:
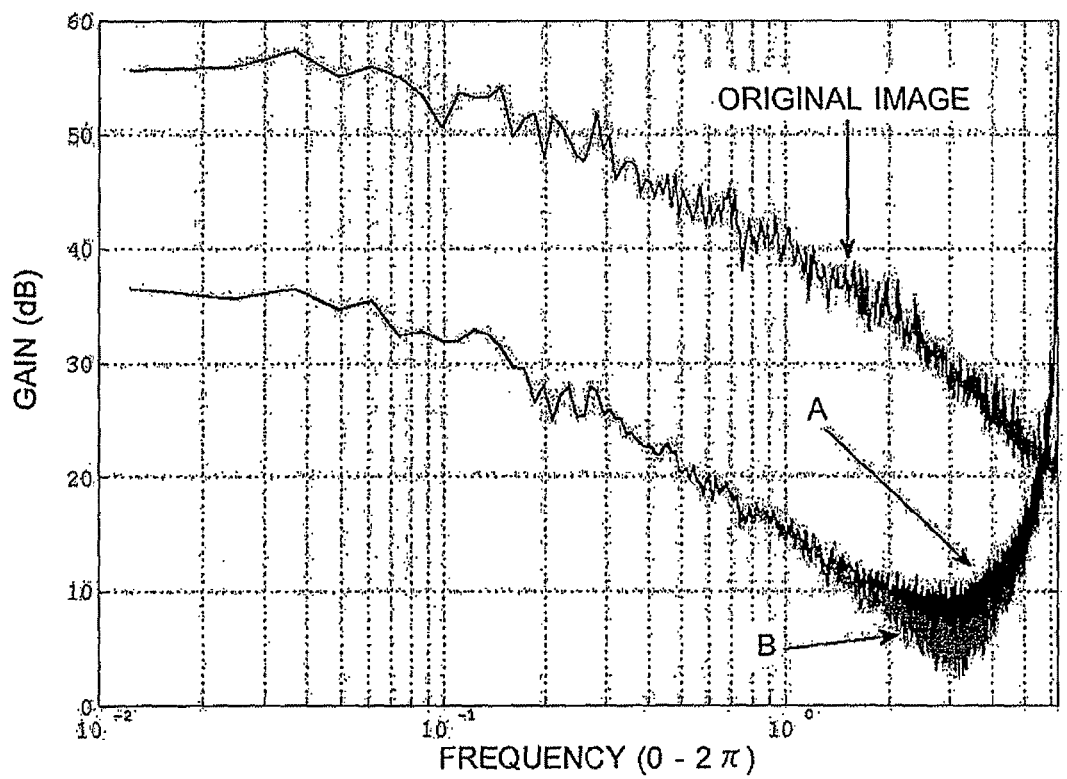
FIG. 7 is a magnitude plot showing one example of the spectra of an original image and an input signal to the digital filter K(z).

In FIG. 7, label "A" indicates the magnitude plot of a low-resolution image signal created by twice downsampling of the aforementioned original image followed by twice upsampling of the resultant image. This plot corresponds to the signal u assumed in the error-system model of FIG. 2. On the other hand, label "B" indicates the magnitude plot of a signal obtained by twice upsampling of an actual low-resolution image (observed image) based on the aforementioned original image. This plot corresponds to the input signal to the linear interpolation filter 3 designed on the basis of the error-system model of FIG. 2 in an actual super-resolution processing. Comparing plots A and B demonstrates that there is no significant difference in the low-frequency range, while the gain of plot B is lower than that of plot A by a few to several dBs in the middle-to-high frequency range. Such a difference can be interpreted as caused by a shift of the observation function assumed in the super-resolution processing. The observation function assumed in the previously described error-system model is the sampler 13 for the analogue signal r. However, under normal conditions, the signal is also affected by additional factors, such as the optical blurring of an image or the averaging of the signal due to digital processing operations. These factors virtually act as a low-pass filter and cause the magnitude of the actual input to the linear interpolation filter 3 to be lower than expected within the middle-to-high frequency range. This leads to a decrease in the gain of the restored signal within the middle-to-high frequency range, which adversely affects the restoring performance of the system.

Figure 6:
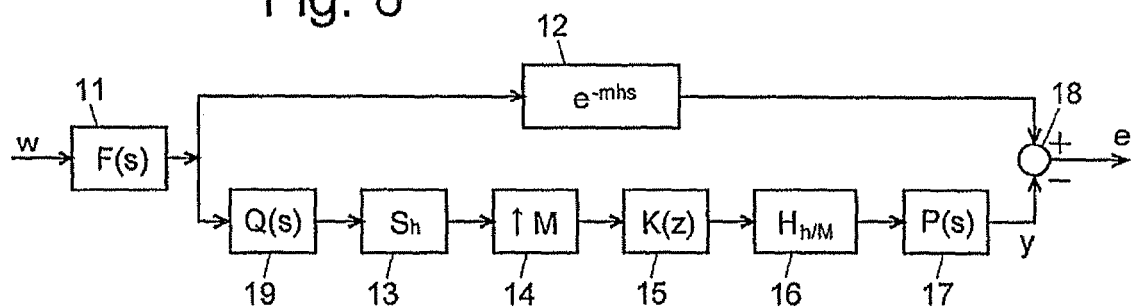
FIG. 6 is an error-system model for designing a digital filter K(z) for a super-resolution processing according to the present invention.

To address this problem, in the super-resolution processing method according to the present invention, a new error-system model has been devised, in which, as shown in FIG. 6, a pre-filter 19 having a transfer function Q(s) is disposed before the sampler 13 and a post-filter 17 having a transfer function P(s) is disposed after the zero-order hold 16. The pre-filter 19 can be regarded as an element for weighting the input to the sampler 13 in the frequency domain. The post-filter 17 can be regarded as an element for weighting in the frequency domain the output of the zero-hold 16. If one or both of the transfer function Q(s) of the pre-filter 19 and the transfer function P(s) of the post-filter 17 is a low-pass characteristic, i.e., if either one or both of the pre-filter 19 and post-filter 17 is designed to attenuate signals within the middle-to-high frequency range, the gain of the digital filter 15 within the middle-to-high frequency range will be increased so as to compensate for the decrease in the gain due to the aforementioned transfer characteristics Q(s) and P(s). Based on this relationship, the characteristic of at least either one of the pre-filter 19 and the post-filter 17 can be designed so as to compensate for the decrease in the gain due to observation. As a result of this gain compensation, the spectrum of the restored image becomes closer to that of the original image, whereby the restoring performance of the super-resolution processing is improved.

Increasing the gain of the digital filter 15 within the middle-to-high frequency range for the sake of gain compensation also has the unfavorable effect that jaggies become more prominent on the edges of the restored image. Jaggies inherently appear on contours or similar portions of the image where colors sharply change, which means that they originate from high-frequency components. This is the most likely reason why jaggies become more prominent in the restored image when the gain within the middle-to-high frequency range is increased for the sake of gain compensation. Given this problem, in the super-resolution processing method according to the present invention, one of the following methods is used to reduce jaggies.

[Method 1]

Figure 10:
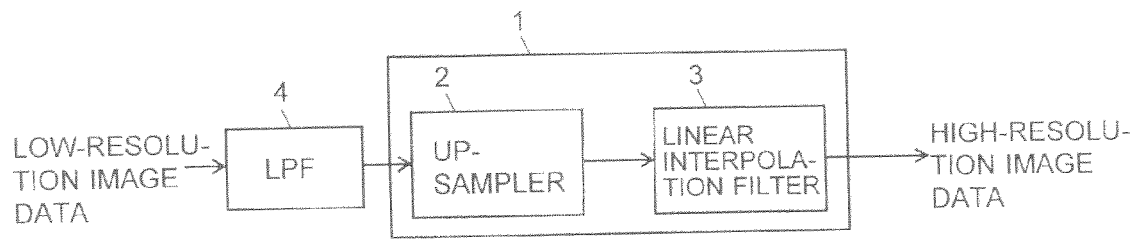
FIG. 10 is a schematic block diagram showing another mode of the super-resolution processing system according to the present invention.

As shown in FIG. 10, the low-resolution image signal to be processed is pre-processed with a low-pass filter 4 before the interpolation by the upsampler 2 and the linear interpolation filter 3 is performed. Thus, high-frequency components, i.e., the possible cause of jaggies, are weakened at the input stage. This method corresponds to the operation of alleviating any sharp changes in the observed image. Method 1 is a measure to be taken when the super-resolution processing is actually performed. Unlike the following Method 2, jaggy reduction is not considered at the stage of designing the linear interpolation filter 3.

[Method 2]

At the stage of designing the linear interpolation filter 3, the transfer characteristic F(s) of the anti-aliasing filter 11 in the error-system model shown in FIG. 6 is deliberately replaced with a stronger low-pass characteristic so as to change the transfer characteristic K(z) of the digital filter 15 to a characteristic that alleviates the tendency of restoration of the high-frequency components. Method 2 is a measure to be taken at the stage of designing the filter. Unlike Method 1, it involves no change in the actual hardware configuration.

The following four simulation experiments have been carried out to verify the effect of the super-resolution processing method according to the present invention.

(1) A result obtained in the case of including the pre-filter 19 in the error-system model at the filter-designing stage was compared with a result obtained without including this filter to confirm that the introduction of the pre-filter 19 compensates for the gain reduction due to the observation function and thereby improves the image-restoring performance.

(2) The effect of jaggy reduction by Methods 1 and 2 was verified.

(3) The restoring performance of the processing method according to the present invention was compared with that of conventional methods (such as the bicubic method or Lanczos method), using natural images included in a set of standard test images.

(4) Two representative test images were subjected to three kinds of super-resolution processing based on the processing method according to the present invention, the Lanczos method and the TV regularization method, respectively, and the image quality in the details of the restored images was examined.

(1) Experiment 1: Confirmation of Gain-Compensating Effect

Figure 8:
FIG. 8 is a standard test image "Lena" (gray-scale version).

FIG. 8 is the original image used for evaluation. This image was reduced to 50% in both the horizontal and vertical directions to create an observed image. The image reduction was achieved by averaging every 2×2 pixels and then downsampling the image by a factor of two. Using this observed image, the transfer characteristics K1(z) and K2(z) of two optimal linear filters were designed. The first optimal linear filter with transfer characteristic K1(z) was based on the error-system model shown in FIG. 2 and included no gain compensation, while the second optimal linear filter with transfer characteristic K2(z) was based on the error-system model shown in FIG. 6 and included gain compensation. The following parameters were used in the design:

$F(s)=1/(150s+1)$ $Q(s)=1/(0.28s+1)$ $P(s)=1$

The analogue characteristic F(s) was an approximation of an envelope of the spectrum of the original image. The sampling period h, the delay m and the factor N for high-speed sampling in the FSFH approximation were h=1, m=4 and N=2, respectively.

Figure 9:
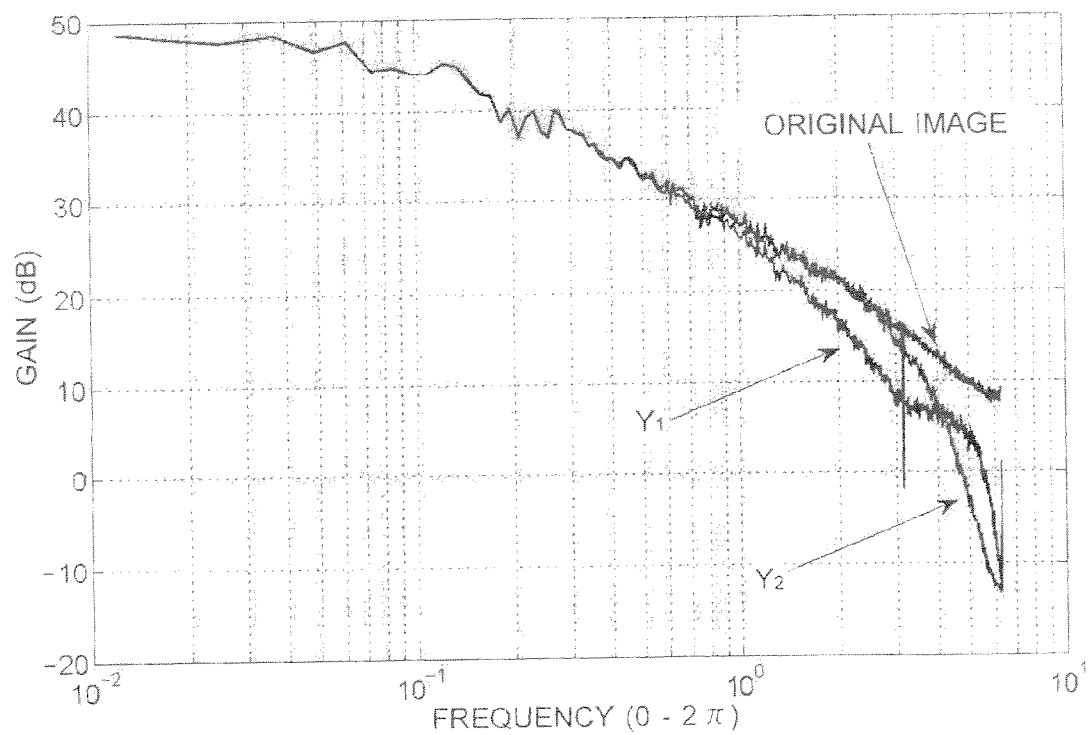
FIG. 9 is a magnitude plot showing one example of the original image and two restored images $Y_1$ and $Y_2$.

FIG. 9 shows the spectra of images restored by the super-resolution processing using linear interpolation filters having the transfer characteristics K1(z) and K2(z) designed under the previously described conditions. Label Y1 denotes the result obtained by using the transfer characteristic K1(z), while label Y2 denotes the result obtained by using the transfer characteristic K2(z).

The peak signal to noise ratio (PSNR) between Y1 and the original image was 30.3876 [dB], and the structural similarity (SSIM) was 0.9700, while the PSNR between Y2 and the original image was 34.9815 [dB], and the SSIM was 0.9983. These results confirm that the PSNR of the restored image can evidently be improved by introducing the pre-filter 19. Similar effects can also be confirmed in the case of using the post-filter 17 in place of the pre-filter. It is also evident that the two filters 17 and 19 can be simultaneously used.

(2) Experiment 2: Comparison of Jaggy-Reduction Techniques

The same observed images as used in Experiment 1 were subjected to super-resolution processing in which the gain compensation was performed and the jaggy reduction by each of the following two methods was applied:

[Method 1] An observed image was pre-processed with a Gaussian filter (a two-dimensional kernel of 7×7 elements; dispersion $\sigma^2$=0.41).

[Method 2] An analogue characteristic expressed by the following equation was given:

$F(s)=1/(10s+1)^2$

Figure 11A:
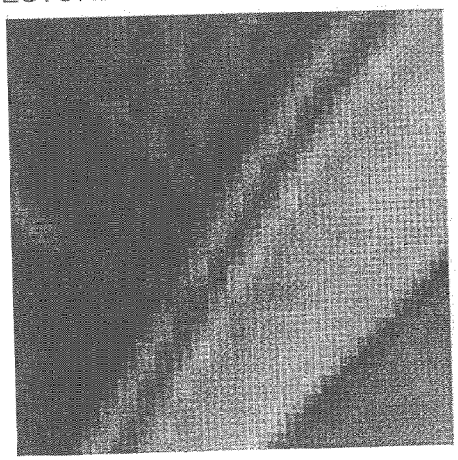
FIGS. 11A-11C are images (partially enlarged views of "Lena") prepared for showing the effect of a jaggy-smoothing process.
Figure 11B:
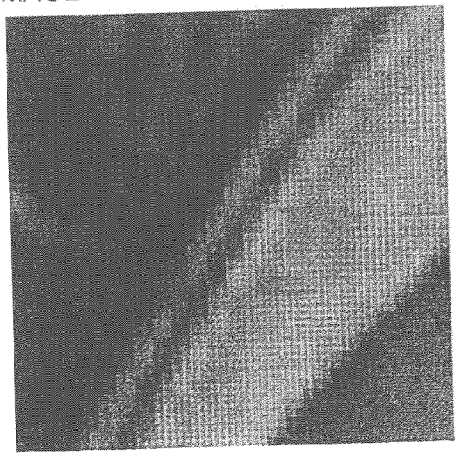
Figure 11C:
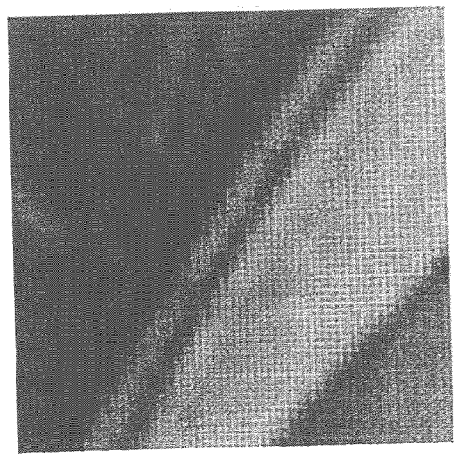

FIGS. 11A-11C show the results of the jaggy-reduction experiments, along with the result obtained by performing only the gain compensation by the pre-filter 19. Each of these images is a partially enlarged view of a restored image obtained by processing the image shown in FIG. 8.

(3) Experiment 3: Evaluation of Restoring Performance

The restoring performance of a method according to the present invention was compared with those of the bicubic method and the Lanczos method by performing twice enlarged super-resolution processing based on each of the three methods, using 24 pieces of colored natural images selected from a photo CD [PCD0992] produced by Eastman Kodak Company. In this experiment, each of the test images was used as the original image, and an image prepared by the same image-reducing method as used in Experiment 1 was regarded as the observed image. The method according to the present invention in this experiment included gain compensation by the pre-filter 19 and jaggy reduction by a strengthened low-pass characteristic of the analogue characteristic. In other words, the filter design was performed using the error-system model shown in FIG. 6, based on the following parameters:

$F(s)=1/(10s+1)^2$ $Q(s)=1/(0.28s+1)$ $P(s)=1$

The following table shows the average values of the PSNR and SSIM obtained by comparing the restored images with the original ones.

TABLE 1

| Method | Average PSNR (dB) | Average SSIM (dB) |
|---|---|---|
| Present Invention | 29.6286 | 0.9972 |
| Lanczos | 29.4433 | 0.9923 |
| Bicubic | 29.2284 | 0.9881 |

(4) Experiment 4: Evaluation of Image Quality

Figure 12A:
FIGS. 12A and 12B are standard test images "Lena" and "Baboon" (color version).
Figure 12B:
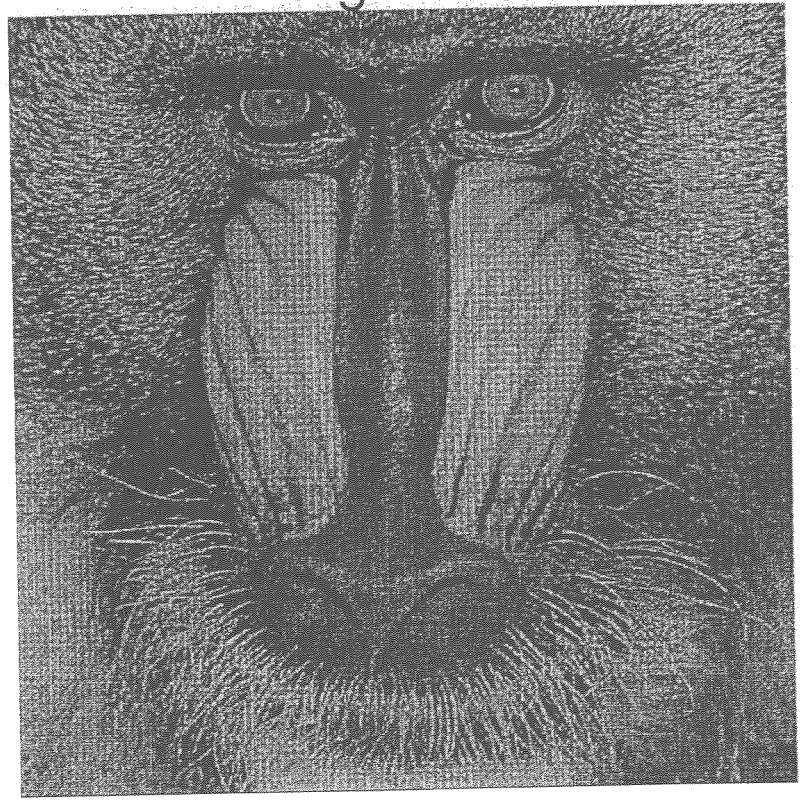

For two color images "Lena" (FIG. 12A) and "Baboon" (FIG. 12B) included in the set of standard test images published by the University of Southern California, super-resolution processing was performed by three different methods (i.e. the Lanczos method, the TV regularization method, and one method according to the present invention using the gain compensation by the pre-filter 19), and the qualities in the details of the obtained images were compared. In this experiment, each of the test images was regarded as the original image, and an image obtained by reducing the original image down to 50% was regarded as the observed image, which was subjected to the super-resolution processing in two, four and eight-times enlargement modes. The image-reducing method and the filter-design parameters for the method according to the present invention were the same as in Experiment 3. As for the experiment of twice enlarged super-resolution processing, in which the restored image had the same size as the original image, the evaluation of the degree of restoration using the PSNR and SSIM was also performed.

A brief description of the process steps of the TV regularization method used in the present experiment is as follows:

(i) An observed image was separated into a structure image and a texture image.

(ii) The structure image was enlarged by Shannon's interpolation method based on the discrete cosine transform, after which TV regularization was applied to the image.

(iii) The texture image was enlarged by the Lanczos method.

(iv) The structure image and the texture image obtained by the foregoing processes were combined together to obtain the final image.

FIGS. 13A-14C are restored images after the twice enlarged super-resolution processing. More specifically, FIGS. 13A-13C are partially enlarged views of Lena including the hat and an area around the right eye. FIGS. 14A-14C are partially enlarged views of Baboon including the moustaches and an area around the left eye. Tables 2 and 3 respectively show PSNR and SSIM values, which are indices representing the degree of similarity between each restored image and the corresponding original image.

TABLE 2

| Method | Lena | Baboon |
| --- | --- | --- |
| Present Invention | 33.7582 | 23.3056 |
| Lanczos | 33.5497 | 23.2691 |
| TV Regularization | 33.3760 | 23.2303 |

TABLE 3

| Method | Lena | Baboon |
| --- | --- | --- |
| Present Invention | 0.9995 | 0.9993 |
| Lanczos | 0.9962 | 0.9881 |
| TV Regularization | 0.9962 | 0.9893 |

FIGS. 15A-16C are restored images after the four-times enlarged super-resolution processing operation, including the same portions as shown in FIGS. 13A-14C. FIGS. 17A-18C are restored images after the eight-times enlarged super-resolution processing operation, including the same portions as shown in FIGS. 13A-14C.

FIG. 9 demonstrates that the gain of the restored image in the experiment with gain compensation is raised closer to the spectrum of the original image in the middle frequency range. The degree of similarity to the original image is also improved by approximately 0.03 in SSIM and by nearly 5 dB in PSNR. These results confirm that compensating for the gain reduction due to observation is effective. This was also proved by the result of Experiment 3. Thus, it has been confirmed that the method according to the present invention is superior to the conventional methods in the sense that the thereby restored image is closer to the original image when their degree of similarity is evaluated by PSNR and SSIM.

As an expected side effect of the gain compensation, jaggies are prominent in the image of FIG. 11A. The image of FIG. 11B demonstrates that using Method 1 for jaggy reduction has some effect for reducing ringing but is barely effective for reducing jaggies. Increasing the variance of the Gaussian filter can further reduce the jaggies, but it also lowers the PSNR of the restored image. Therefore, using a stronger low-pass filter is impractical. On the other hand, the jaggy-reducing effect is clearly noticeable in the image of FIG. 11C obtained by using Method 2 in which the analogue characteristic F(s) was changed. Based on these results, the technique of replacing the analogue characteristic F(s) was adopted for jaggy reduction in Experiments 3 and 4. It should be noted that changing the analogue characteristic F(s) means changing the target level of the signal for the filter design. Depending on the type of image, this operation may cause image degradation and should be carefully applied.

FIGS. 13A-18C demonstrate that the processing method according to the present invention is superior to the conventional methods in terms of the detail quality of the restored images. This can be confirmed, for example, from the difference in the clearness of the gather of Lena's hat or the degree of separation of Baboon's moustaches. Furthermore, the images restored by the processing method according to the present invention generally give the impression that they are better focused and clearer than those restored by the conventional methods. From these results, it can be said that the restoring performance of the super-resolution processing method according to the present invention is sufficiently higher than those of the conventional methods, such as the Lanczos method or TV regularization method.

It should be noted that the previous embodiment is a mere example of the present invention, and any change, modification or addition appropriately made within the spirit of the present invention will naturally fall into the scope of claims of the present patent application.

EXPLANATION OF NUMERALS

1 . . . Super-Resolution Processing Unit
2 . . . Upsampler
3 . . . Linear Interpolation Filter
4 . . . Low-Pass Filter
11 . . . Anti-Aliasing Filter
12 . . . Delay Element
13 . . . Sampler
14 . . . Upsampler
15 . . . Digital Filter
16 . . . Zero-Order Hold
17 . . . Post-Filter
18 . . . Subtractor
19 . . . Pre-Filter

The invention claimed is:

1. A super-resolution processing method for creating a high-resolution image from a low-resolution image, in which super-resolution processing is carried out by performing an interpolation between picture elements by using a linear digital filter in each of horizontal and vertical directions of an image to be processed, wherein:

the linear digital filter is an IIR filter using, as coefficients thereof, parameters calculated by solving the following equation formulated so as to design an IIR filter with no limitation on the order:

$$// Tew// := \sup_{w \in L^2[0,\infty), w \neq 0} \frac{// Teww // L^2[0, \infty)}{// w // L^2[0, \infty)} < \gamma$$

by sampled-data $H^\infty$ control so that the error signal e will be smaller than the prespecified performance level $\gamma$ in terms of the $H^\infty$ norm, where the error signal e corresponds to the error between the band-limited signal obtained by passing the original analogue signal w of an original image through a band-limiting filter and the analogue signal obtained by passing the band-limited signal through an analogue-digital-analogue conversion system including a sampler for discretizing the analogue signal, an upsampler for inserting a predetermined number of zeros between sampling points, a digital filter, a hold element for restoring a discrete signal to a continuous signal, and at least either one of a pre-filter and a post-filter for weighting the continuous signal for each frequency range of the continuous signal, a frequency characteristic of the pre-filter or the post-filter being determined so as to compensate for a decrease in the gain within a middle-to-high frequency range in the low-resolution image to be processed, and $T_{ew}$ is the transfer function of the system that transforms the analogue signal w into the error signal e; and a low-pass filter is provided before the linear digital filter for smoothing the signal of the low-resolution image to be processed.

2. A super-resolution processing system for creating a high-resolution image from a low-resolution image, which carries out super-resolution processing by performing an interpolation between picture elements by using a linear digital filter in each of horizontal and vertical directions of an image to be processed, wherein:

the linear digital filter is an IIR filter using, as coefficients thereof, parameters calculated by solving the following equation formulated so as to design an IIR filter with no limitation on the order:

$$// Tew// := \sup_{w \in L^2[0,\infty), w \neq 0} \frac{// Teww // L^2[0, \infty)}{// w // L^2[0, \infty)} < \gamma$$

by sampled-data $H^\infty$ control so that the error signal e will be smaller than the prespecified performance level $\gamma$ in terms of the $H^\infty$ norm, where the error signal e corresponds to the error between the band-limited signal obtained by passing the original analogue signal w of an original image through a band-limiting filter and the analogue signal obtained by passing the band-limited signal through an analogue-digital-analogue conversion system including a sampler for discretizing the analogue signal, an upsampler for inserting a predetermined number of zeros between sampling points, a digital filter, a hold element for restoring a discrete signal to a continuous signal, and at least either one of a pre-filter and a post-filter for weighting the continuous signal in the frequency domain, the frequency characteristic of the pre-filter or the post-filter being determined so as to compensate for a decrease in the gain within a middle-to-high frequency range in the low-resolution image to be processed, and $T_{ew}$ is the transfer function of the system that transforms the analogue signal w into the error signal e; and a low-pass filter is provided before the linear digital filter for smoothing the signal of the low-resolution image to be processed.

3. A super-resolution processing method for creating a high-resolution image from a low-resolution image, in which super-resolution processing is carried out by performing an interpolation between picture elements by using a linear digital filter in each of horizontal and vertical directions of an image to be processed, wherein:

the linear digital filter is an IIR filter using, as coefficients thereof, parameters calculated by solving the following equation formulated so as to design an IIR filter with no limitation on the order:

$$// Tew// := \sup_{w \in L^2[0,\infty), w \neq 0} \frac{// Teww // L^2[0, \infty)}{// w // L^2[0, \infty)} < \gamma$$

by the sampled-data $H^\infty$ control so that the error signal e will be smaller than the prespecified performance level $\gamma$ in terms of the $H^\infty$ norm, where the error signal e corresponds to the error between the band-limited signal obtained by passing an analogue signal w of an original image through a band-limiting filter and the analogue signal obtained by passing the band-limited signal through an analogue-digital-analogue conversion system including a sampler for discretizing the analogue signal, an upsampler for inserting a predetermined number of zeros between sampling points, a digital filter, a hold element for restoring a discrete signal to a continuous signal, and at least either one of a pre-filter and a post-filter for weighting the continuous signal in the frequency domain, the frequency characteristic of the pre-filter or the post-filter being determined so as to compensate for a decrease in the gain within a middle-to-high frequency range in the low-resolution image to be processed, and $T_{ew}$ is the transfer function of the system that transforms the analogue signal w into the error signal e; and when the parameters used as the coefficients of the IIR filter are calculated, the gain within a middle-to-high frequency range and high frequency range of the analogue frequency characteristic of the band-limiting filter is set to be lower than the level corresponding to the frequency characteristic of the low-resolution image to be processed.

4. A super-resolution processing system for creating a high-resolution image from a low-resolution image, which carries out super-resolution processing by performing an interpolation between picture elements by using a linear digital filter in each of horizontal and vertical directions of an image to be processed, wherein:

the linear digital filter is an IIR filter using, as coefficients thereof, parameters calculated by solving the following equation formulated so as to design an IIR filter with no limitation on the order:

$$// Tew// := \sup_{w \in L^2[0,\infty), w \neq 0} \frac{// Teww // L^2[0, \infty)}{// w // L^2[0, \infty)} < \gamma$$

by sampled-data $H^\infty$ control so that the error signal e will be smaller than the prespecified performance level $\gamma$ in terms of the $H^\infty$ norm, where the error signal e corresponds to the error between the band-limited signal obtained by passing an analogue signal w of an original image through a band-limiting filter and the analogue signal obtained by passing the band-limited signal through an analogue-digital-analogue conversion system including a sampler for discretizing an analogue signal, an upsampler for inserting a predetermined number of zeros between sampling points, a digital filter, a hold element for restoring a discrete signal to a continuous signal, and at least either one of a pre-filter and a post-filter for weighting the continuous signal in the frequency domain, the frequency characteristic of the pre-filter or the post-filter being determined so as to compensate for a decrease in the gain within a middle-to-high frequency range in the low-resolution image to be processed, and $T_{ew}$ is the transfer function of the system that transforms the analogue signal w into the error signal e; and when the parameters used as the coefficients of the IIR filter are calculated, the gain within a middle-to-high frequency range and high frequency range of the analogue frequency characteristic of the band-limiting filter is set to be lower than the level corresponding to the frequency characteristic of the low-resolution image to be processed.

\* \* \* \* \*